Patented Apr. 23, 1935

1,999,061

UNITED STATES PATENT OFFICE 1,999,061

PRODUCTION OF 3-MENTHENE

Walter Schoeller, Berlin-Westend, and Erich Borgwardt, Berlin-Pankow, Germany, assignors to Schering-Kahlbaum A. G., Berlin, Germany No Drawing. Application July 25, 1931, Serial No. 553,196. In Germany August 2, 1930

11 Claims. (Cl. 260—167)

Our invention refers to the production of 3-menthene

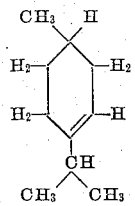

We have found that by treating 8-menthanol

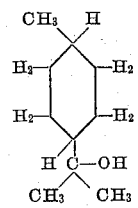

or a derivative thereof at a temperature above the normal with dehydrating agents, water is split off and the double-bond is shifted into the nucleus, so that 3-menthene is obtained, which serves as starting material for the production of 3-menthanol (menthol).

Besides 8-menthanol we may also use its derivatives, such as for instance its esters or ethers or a mixture of 8-menthanol and 1-menthanol

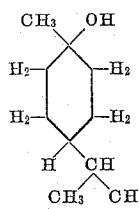

which can be obtained in a well known manner by hydrogenating technical terpineol.

As catalysts having a dehydrating action we may use highly porous substances having a large surface (so-called surface catalysts) such as for instance fuller's earth and its equivalent which are hydrated magnesium-aluminium silicates, further pumice stone, silica gel or surface catalysts containing salts. We prefer using salts of polybasic acids with an alkaline earth such as sulfate or phosphate of magnesia or with copper such as sulfate or phosphate of copper.

We have found temperatures within the range of 300–500° C. to be particularly suitable, however, the reaction proceeds also, only less smoothly at lower and higher temperatures.

The 8-menthanol can either be conducted in the vapour phase over the catalysts or can be heated together with them in an autoclave.

Example 1

8-menthanol obtainable for instance by hydrogenating α-terpineol is conducted in the vapour phase through a tube heated to 300° C. charged with the surface catalyst known under the tradename "Tonsil" which is a magnesium aluminium hydrosilicate prepared from zeolites. The vapors escaping from this tube are condensed. The 3-menthene thus obtained boils at 168–169° C.

Example 2

8-menthanol formiate obtained by hydrogenating α-terpineol formiate, if treated as described with reference to Example 1, is also converted into 3-menthene.

Example 3

A mixture of 1-menthanol and 8-menthanol obtained by hydrogenation of technical terpineol is conducted at a temperature between 350 and 400° C. over "Tonsil" and the condensate formed is subjected to fractionated distillation. We thus obtain about 60–80% 3-menthene. The remainder which mainly consists of 1-menthene is converted into 3-menthene by passing it anew in contact with the catalyst.

We may also proceed in this manner that the 3-menthene is separated from the resulting product in some suitable apparatus, while the rest is caused to circulate in contact with the catalyst until all of it has been converted into 3-menthene.

Example 4

A mixture of 1-menthanol and 8-menthanol is conducted over a catalyst consisting of magnesium phosphate deposited on pumice stone, the catalyst being arranged in a tube heated to 300–350° C. 70% of the escaping gas consist of 3-menthene, the rest is treated as described with reference to Example 3.

Various changes may be made in the details disclosed in the foregoing specification without departing from the invention or sacrificing the advantages thereof.

We claim:—

1. The method of producing 3-menthene, comprising bringing a product containing 8-menthanol at temperatures of 300–500° C. in contact with a catalyst having a dehydrating action.

2. The method of producing 3-menthene, comprising treating a product containing 8-menthanol at temperatures of 300–500° C. with a highly porous large surface carrier on which is precipitated a salt of a multivalent acid with a metal of the group of metals consisting of the alkaline earth metals and copper.

3. The method of producing 3-menthene, comprising treating a product containing 8-menthanol at temperatures of 300–500° C. with a highly porous large surface carrier on which is precipitated magnesium phosphate.

4. The method of producing 3-menthene, comprising treating a mixture, obtained by hydrogenation of terpineol, at 300–500° C. with a surface catalyst.

5. The method of producing 3-menthene, comprising treating a mixture, obtained by hydrogenation of terpineol, at 300–500° C. with a highly porous large surface carrier on which is precipitated a salt of a multivalent acid with a metal of the group of metals consisting of the alkaline earth metals and copper.

6. The method of producing 3-menthene, comprising treating a mixture, obtained by hydrogenation of terpineol, at 300–500° C. with a highly porous large surface carrier on which is precipitated magnesium phosphate.

7. The method of producing 3-menthene, comprising bringing a product containing 8-menthanol at temperatures of 300–500° C. in contact with a surface catalyst.

8. The method of producing 3-menthene, comprising bringing a product containing 8-menthanol at temperatures of 300–500° C. in contact with a catalytically active salt of a polybasic acid with an alkaline earth metal.

9. The method of producing 3-menthene, comprising bringing a product containing 8-menthanol at temperatures of 300–500° C. in contact with a catalytically active salt of a polybasic acid with copper.

10. The method of producing 3-menthene, comprising treating a mixture, obtained by hydrogenation of terpineol, at 300–500° C. with a highly porous large surface carrier on which is precipitated copper phosphate.

11. The method of producing 3-menthene, comprising treating a mixture, obtained by hydrogenation of terpineol, at 300–500° C. with a highly porous large surface carrier on which is precipitated magnesium sulfate.

WALTER SCHOELLER.
ERICH BORGWARDT.